(12) United States Patent
Liao

(10) Patent No.: US 6,789,923 B2
(45) Date of Patent: Sep. 14, 2004

(54) BACKLIGHT MODULE WITH HEAT DISSIPATION STRUCTURE

(76) Inventor: Chun Chi Liao, 6F, No. 15-2, Lane 420, Cheng Cong Road Section 5, Taipei (TW)

( * ) Notice: Subject to any disclaimer, the term of this patent is extended or adjusted under 35 U.S.C. 154(b) by 37 days.

(21) Appl. No.: 10/345,275

(22) Filed: Jan. 16, 2003

(65) Prior Publication Data
US 2004/0141322 A1 Jul. 22, 2004

(51) Int. Cl.$^7$ .............................................. F21V 29/00
(52) U.S. Cl. ....................... 362/294; 362/373; 362/247; 362/241; 362/240
(58) Field of Search ................ 362/294, 373, 362/247, 241, 240, 249, 23, 29

(56) References Cited

U.S. PATENT DOCUMENTS

| | | | | |
|---|---|---|---|---|
| 3,733,461 A | * | 5/1973 | Rohats | 392/423 |
| 5,034,866 A | * | 7/1991 | Pujol | 362/240 |
| 5,473,523 A | * | 12/1995 | Von Fange | 362/232 |
| 6,048,075 A | * | 4/2000 | Lai | 362/240 |
| 2004/0008512 A1 | * | 1/2004 | Kim | 362/235 |
| 2004/0076006 A1 | * | 4/2004 | Mai | 362/241 |

* cited by examiner

Primary Examiner—Thomas M. Sember
Assistant Examiner—Jacob Y. Choi
(74) Attorney, Agent, or Firm—Rosenberg, Klein & Lee

(57) ABSTRACT

A backlight module for liquid crystal display includes a casing having a bottom wall and a circumferential side wall extending from the bottom wall to define an open top. A light guide plate is attached to the side wall and spaced from the bottom to define an interior space therebetween. A light diffusion plate and a protection plate are respectively mounted to the top opening of the casing. A plurality of lamps are arranged in the interior space and spaced from each other. First vent holes are defined in the side wall of the casing to allow air to flow in and out of the interior space for removing heat generated by the lamps. Second vent holes are defined in the side wall and are paired of which the second vent holes are opposite to each other. A triangular channel is formed between the second vent holes of each pair by two inclined side walls. Air is allowed to flow into the channel via one of the second vent holes, through the channel and eventually leaving the channel via another second vent hole. The air flowing through the channel removes heat induced on the side walls by radiation of the lamps. The side walls of each channel, which have reflective surfaces, are arranged to reflect light from the adjacent lamps toward the light guide plate for uniformly distributing the light over the light guide plate, which is then projected onto the liquid crystal display.

4 Claims, 6 Drawing Sheets

BACKLIGHT MODULE WITH HEAT DISSIPATION STRUCTURE

BACKGROUND OF THE INVENTION

1. Field of the Invention

The present invention generally relates to a backlight module for a liquid crystal display (LCD), and in particular to a backlight module having a heat dissipation structure for removing heat induced by electromagnetic radiation emitted by lamps of the LCD.

2. The Related Art

A liquid crystal display (LCD) comprises a liquid crystal panel arranged in association with a backlight module in which light sources are arranged to project light through the liquid crystal panel for formation of images on the liquid crystal panel. FIG. 6 of the attached drawings shows a conventional backlight module, which is generally designated with reference numeral 10, comprising a casing 11 in which lamps 12 are mounted. A light guide plate 13, a light diffusion plate 14 and a protection plate 15 are stacked in sequence and mounted to the casing 11 in front of the lamps 12 whereby light emitted by the lamps 12 transmits through the light guide plate 13, the light diffusion plate 14 and the protection plate 15.

The lamps 12 of the conventional device are arranged substantially on the same plane and spaced from each other. The distance between adjacent lamps 12 induces a dark strip that leads to non-uniform distribution of brightness over the whole panel. In addition, the great number of lamps 12 mounted inside a limited space within the backlight module 10 causes a serious problem of heat that is generated by the lamps 12 during their operation.

A triangular structure comprised of a prism arranged between adjacent lamps 12 has been proposed to alleviate the non-uniform brightness issue. However, the issue of heat dissipation is not overcome yet.

Thus, it desired to have a backlight module for LCD to overcome the heat problems, while providing uniform brightness.

SUMMARY OF THE INVENTION

An object of the present invention is to provide a backlight module comprising air passages formed by side walls made of heat conductive material and vent holes for formation of air flow through the air passages to effectively remove heat from the backlight module.

Another object of the present invention is to provide a backlight module comprising a heat dissipation structure having a triangular configuration for both removal of heat and re-direction of light to provide uniform distribution of the light.

A further object of the present invention is to provide a backlight module capable of effectively removing heat therefrom while maintaining structural strength and stability.

To achieve the above objects, in accordance with the present invention, there is provided a backlight module for liquid crystal display, comprising a casing having a bottom wall and a circumferential side wall extending from the bottom wall to define an open top. A light guide plate is attached to the side wall and spaced from the bottom to define an interior space therebetween. A light diffusion plate and a protection plate are respectively mounted to the top opening of the casing. A plurality of lamps are arranged in the interior space and spaced from each other. First vent holes are defined in the side wall of the casing to allow air to flow in and out of the interior space for removing heat generated by the lamps. Second vent holes are defined in the side wall and are paired of which the second vent holes are opposite to each other. A triangular channel is formed between the second vent holes of each pair by two inclined side walls. Air is allowed to flow into the channel via one of the second vent holes, through the channel and eventually leaving the channel via another second vent hole. The air flowing through the channel removes heat induced on the side walls by radiation of the lamps. The side walls of each channel, which have reflective surfaces, are arranged to reflect light from the adjacent lamps toward the light guide plate for uniformly distributing the light over the light guide plate.

BRIEF DESCRIPTION OF THE DRAWINGS

The present invention will be apparent to those skilled in the art by reading the following description of preferred embodiment thereof, with reference to the attached drawings, in which.

DETAILED DESCRIPTION OF THE PREFERRED EMBODIMENT

Figure 1:
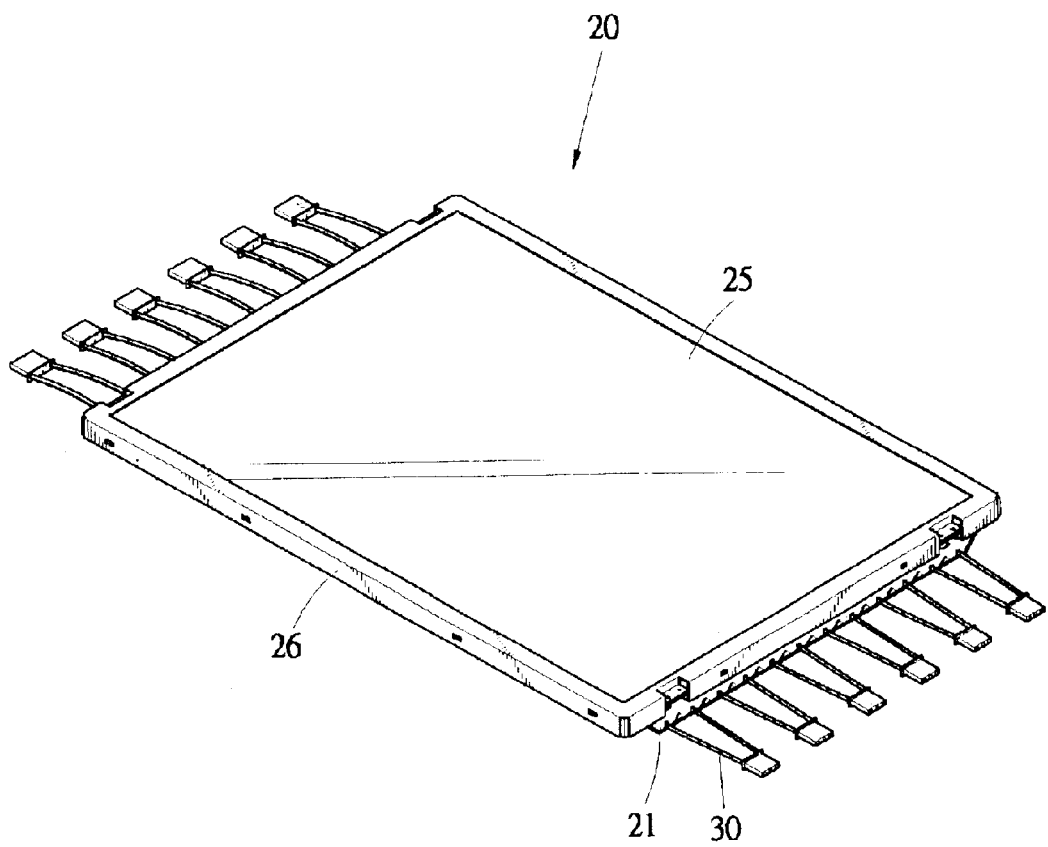
FIG. 1 is a perspective view of a backlight module constructed in accordance with the present invention.
Figure 2:
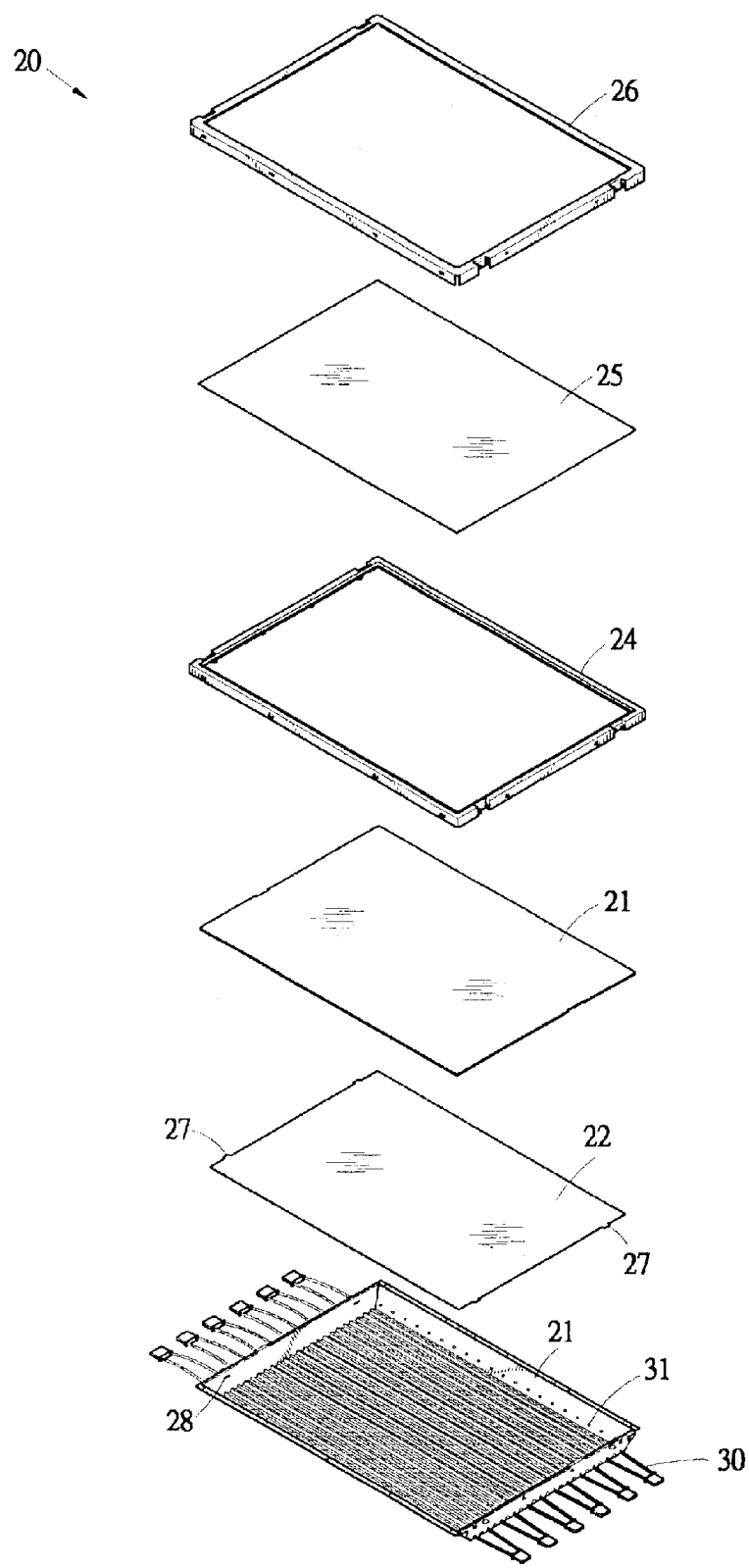
FIG. 2 is an exploded view of the backlight module of the present invention.
Figure 3:
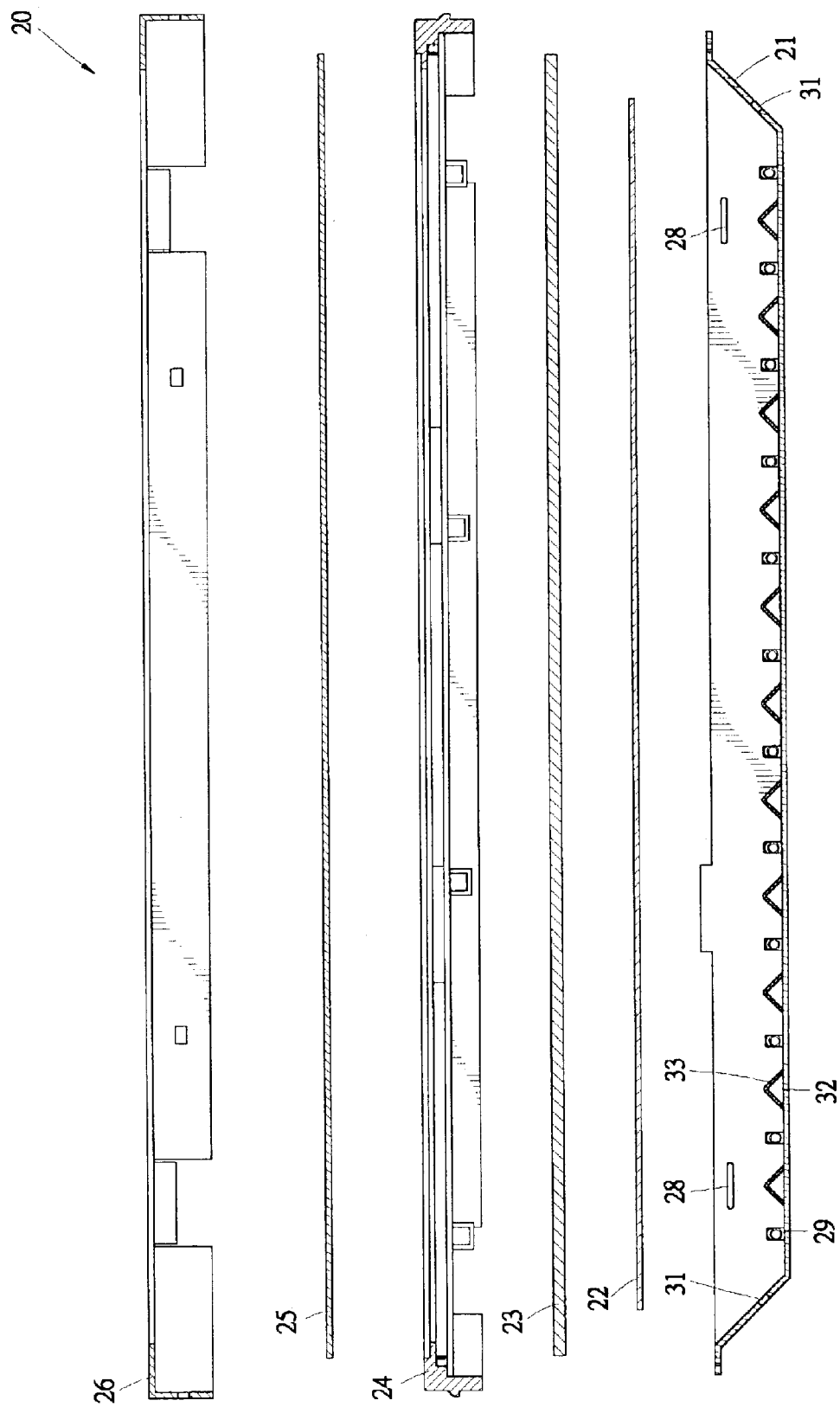
FIG. 3 is an exploded view, in cross-sectional form, of the backlight module of the present invention.
Figure 4:
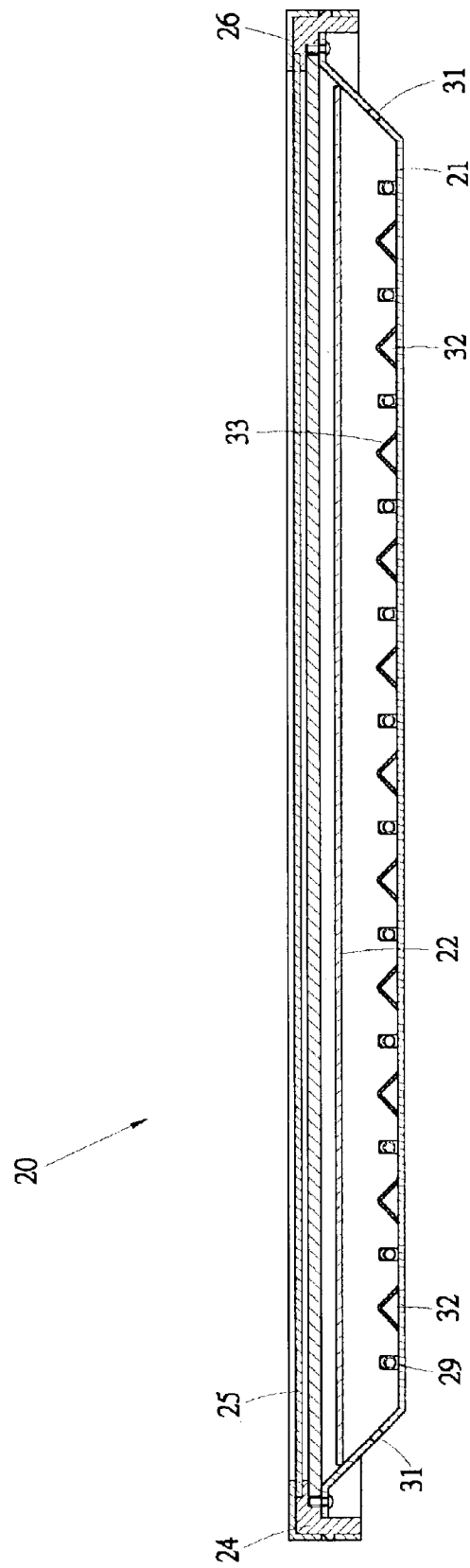
FIG. 4 is an assembled view of FIG. 3.

With reference to the drawings and in particular to FIGS. 1–4, a backlight module constructed in accordance with the present invention, generally designated with reference numeral 20, comprises a casing 21 having a bottom wall and a circumferential side wall, both being not labeled, extending from the bottom wall to define a top opening. A plurality of tubular lamps 29 are fixed on the bottom wall inside the casing 21 and are substantially parallel to each other. Each lamp 29 is powered by wires 30.

A light guide plate 22 is received in and fixed within the casing 21 via the top opening and is spaced from the lamps 29. The light guide plate 22 has a circumferential edge (not labeled) from which tabs 27 extend. The tabs 27 are received and fixed in slots 28 defined in the side wall of the casing 21 for retaining the light guide plate 22 in the casing 21. An interior space (not labeled) is thus defined between the light guide plate 22 and the bottom wall of the casing 21 for accommodating the lamps 29 and a heat dissipation structure (not labeled) to be further described.

A light diffusion plate 23 is supported on a circumferential flange (not labeled) formed around the top opening of the casing 21 and is retained in position by an inner retainer frame 24. A protection plate 25 is stacked on the inner retainer frame 24 and is secured in position by an outer retainer frame 26. Light emitted from the lamps 29 transmits through the light guide plate 22, the light diffusion plate 23 and the protection plate 25 is sequence and eventually projects onto a liquid crystal panel (not shown).

Figure 5:
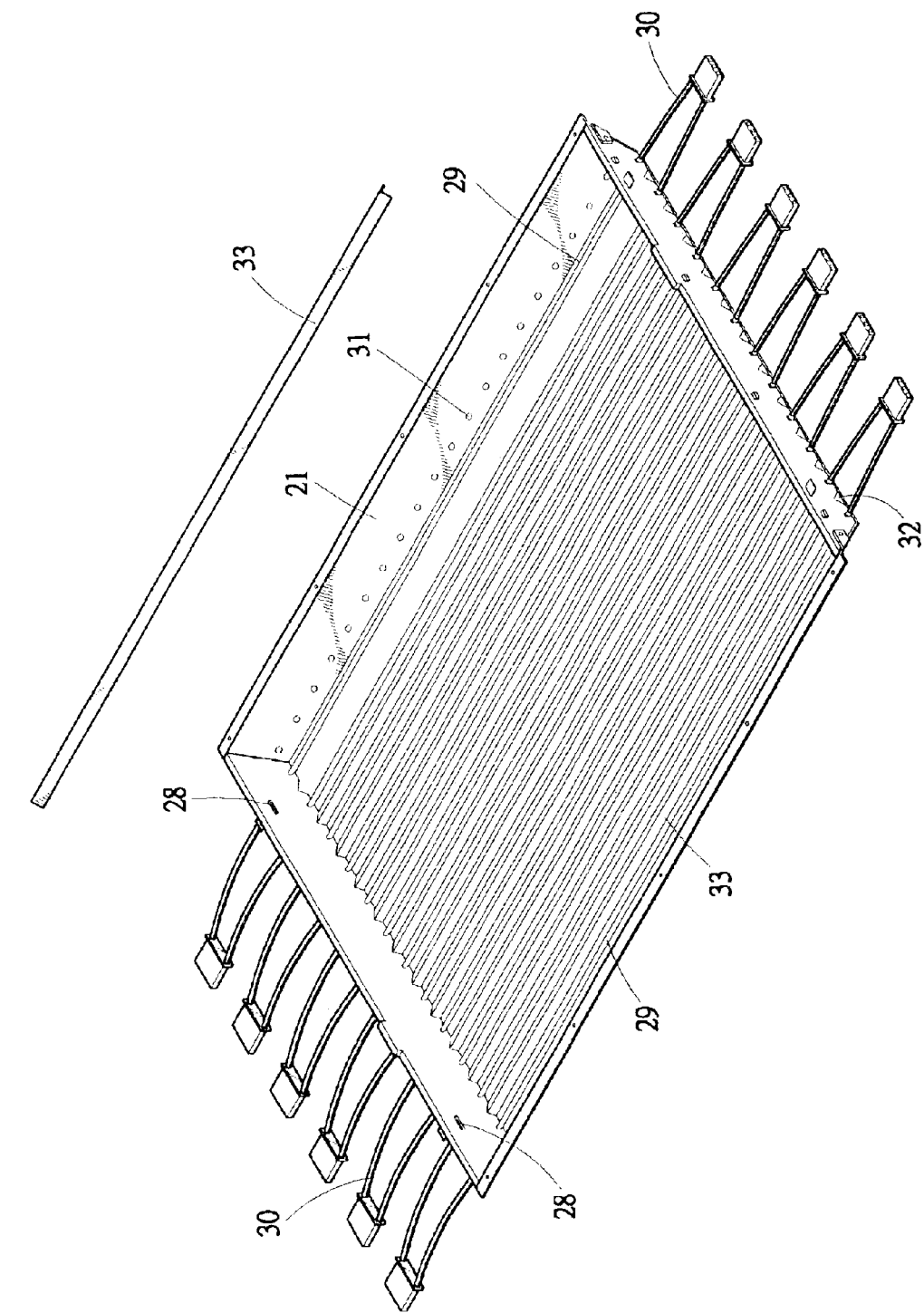
FIG. 5 is a perspective view of a casing of the backlight module of the present invention with a heat dissipation channel detached therefrom.
Figure 6:
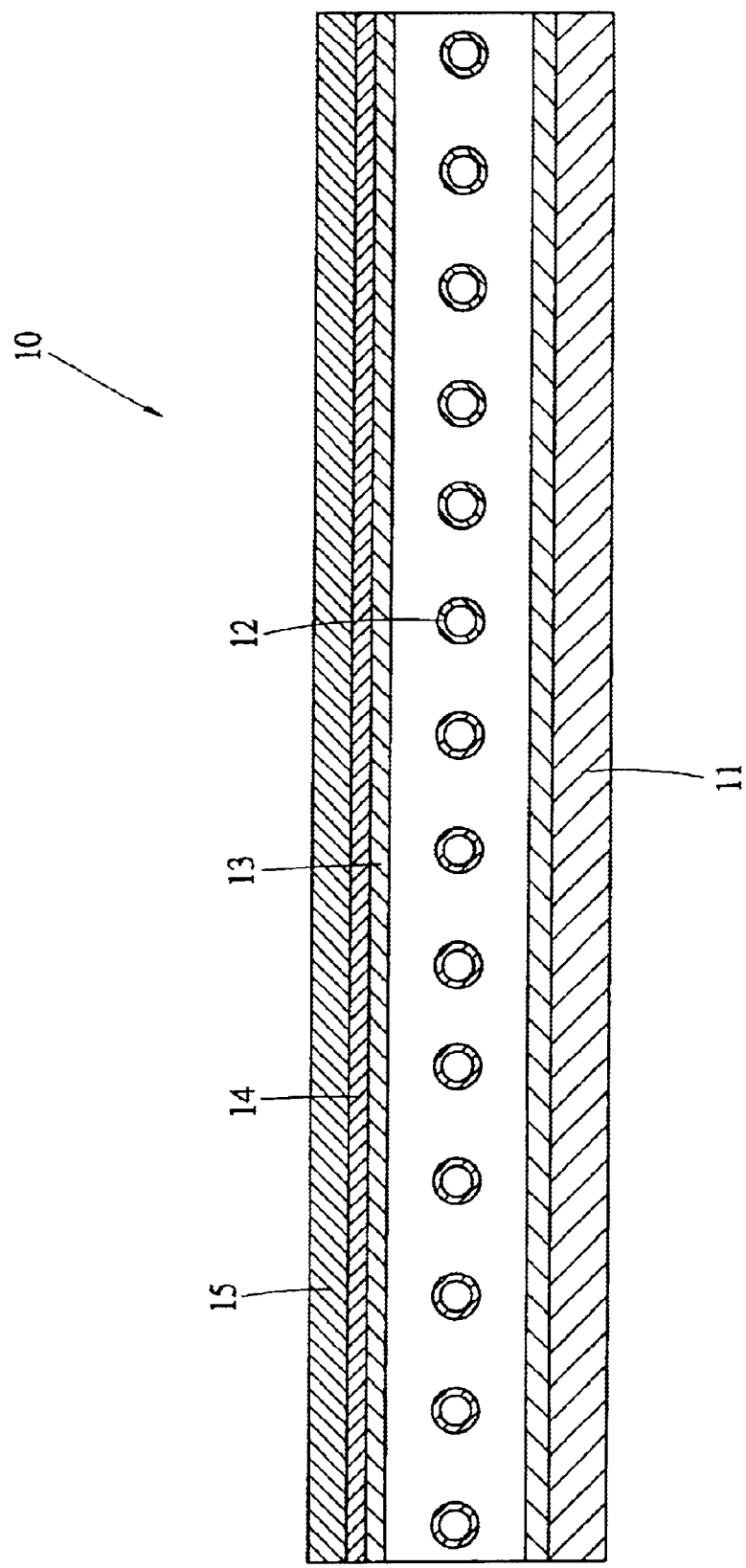
FIG. 6 is a cross-sectional view of a conventional backlight module of liquid crystal displays.

In the embodiment illustrated, the casing 21 has a rectangular configuration whereby the side wall is comprised of four sections opposing each other. First vent holes 31 are defined in two opposite sections of the side wall of the casing 21, while second vent holes 32 are defined in the remaining sections of the side wall. The heat dissipation structure in accordance with the present invention comprises a plurality of channel-like members 33 having a triangular cross-section and each positioned between adjacent lamps 29. Each channel 33 has opposite ends respectively received and fixed in the corresponding second vent holes 32 defined in the side wall of the casing 21 as shown in FIG. 5.

Each triangular channel 33 is positioned on the bottom wall of the casing 21 whereby a triangular ridge is formed on the bottom wall in which an air passage extending between the second vent holes 32 is defined The second vent holes 32 have a triangular shape for receiving the ends of the triangular channels 33 therein and allow air to flow into and through the channels 33 via the second vent holes 32. Thus, air flows can be formed in the channels 33 and travel through the air passages defined in the channels 33 from the second vent holes 32 defined in one section of the side wall to the opposite section of the side wall.

Each channel 33 has two side walls, preferably made of heat conductive plates, such as metal plates, connected to each other to form the triangular channel. The side walls of each channel 33 face the lamps 29 that are arranged adjacent to the channel 33. The side walls function as reflective surfaces for reflecting the light from the lamps 29 toward the light guide plate 22. Non-uniform distribution of light can thus be eliminated for the reflective surfaces of the channels 33 help uniformly distributing the light from the lamps 29. In this respect, the side walls of the channel 33 is preferably coated with a layer of light reflective material, such as forming a mirror surface for helping reflecting the light.

Heat induced by the radiation from the lamps 29 on the side walls of the channels 33 is transferred to the air flow-through the channels 33. The air that flows through the channels 33 between the second vent holes 32 brings away the heat and thus dissipating heat generated inside the backlight module 20.

The first vent holes 31 that are defined in the side wall of the casing 21 allow air to flow in and out of the casing 21 for further removing heat generated by the lamps 29. Thus, heat generated by the lamps 29 inside the casing 21 can be effectively removed by air flows through the first vent holes 31, as well as air flows through the channels 33 via the second vent holes 32. The side walls of the channels 33 help uniformly distributing the light and eliminating dark strips.

Since the first and second vent holes 31, 32 are both formed in the side wall of the casing 21, rather than in the bottom wall of the casing 21, the structural integration of the casing 21 can be maintained thereby retaining structural strength and stability of the casing.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A backlight module comprising:

a casing forming an interior space defined by a bottom wall and a circumferential side wall, the side wall extending from the bottom wall and defining an open top adapted to receive and fix an optic panel;

a plurality of lamps arranged in the interior space and spaced from each other; and a heat dissipation structure comprising:

first vent holes defined in the side wall to allow air to flow in and out of the interior space for removing heat generated by the lamps, second vent holes defined in the side wall, the second vent holes being paired and opposite to each other, and a channel mounted to the bottom wall and arranged between adjacent lamps, the channel being formed by two inclined side walls to form an air passage between the two second vent holes of each pair whereby air is allowed to flow in and out of the channel through the second vent holes to form an air flow through the channel, the side walls of each channel being arranged to reflect light from the adjacent lamp toward the open top of the casing and thus the optic panel.

2. The backlight module as claimed in claim 1, wherein the side walls of each channel are made of metal that forms reflective surface of the side walls.

3. The backlight module as claimed in claim 1, wherein each side wall of each channel comprises a reflective coating formed thereon.

4. The backlight module as claimed in claim 1, wherein the optic panel comprises a light guide plate mounted to the side wall of the casing, a light diffusion plate mounted to the top opening of the casing and retained in positioned by an inner frame, a protection plate being mounted to the inner frame and retained in position by an outer frame.

\* \* \* \* \*